United States Patent
Schwab

(10) Patent No.: US 10,384,554 B2
(45) Date of Patent: Aug. 20, 2019

(54) METHOD AND APPARATUS FOR OPERATING A CONTACTLESS CHARGING DEVICE FOR THE DISTURBANCE FREE OPERATION OF THE KEYLESS ENTRY SYSTEM

(71) Applicant: Bayerische Motoren Werke Aktiengesellschaft, Munich (DE)

(72) Inventor: Axel Schwab, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 695 days.

(21) Appl. No.: 14/921,951

(22) Filed: Oct. 23, 2015

(65) Prior Publication Data
US 2016/0039302 A1    Feb. 11, 2016

Related U.S. Application Data

(63) Continuation of application No. PCT/EP2014/058369, filed on Apr. 24, 2014.

(30) Foreign Application Priority Data

May 2, 2013   (DE) .................. 10 2013 208 005

(51) Int. Cl.
*H02J 7/00*    (2006.01)
*B60L 11/18*   (2006.01)
(Continued)

(52) U.S. Cl.
CPC ............ *B60L 11/1838* (2013.01); *B60L 3/00* (2013.01); *B60L 53/12* (2019.02); *B60L 53/60* (2019.02);
(Continued)

(58) Field of Classification Search
CPC ................................................. B60L 11/1838
(Continued)

(56) References Cited

U.S. PATENT DOCUMENTS

2007/0263902 A1   11/2007  Higuchi et al.
2009/0085522 A1    4/2009  Matsumoto
(Continued)

FOREIGN PATENT DOCUMENTS

DE    10 2006 042 547 A1    3/2008
DE    10 2007 046 562 A1    4/2009
(Continued)

OTHER PUBLICATIONS

PCT/EP2014/058369, International Search Report dated Nov. 19, 2014 (Three (3) pages).
(Continued)

*Primary Examiner* — Richard V Muralidar
(74) *Attorney, Agent, or Firm* — Crowell & Moring LLP

(57) ABSTRACT

The contactless charging device is designed to provide a charging current for at least one specified energy store in the vehicle in such a manner that a current is transferred from a fixed location primary coil to a secondary coil in the vehicle depending on a magnetic field change generated by the charging device. During a charging phase of the at least one energy store, the invention detects, depending on specified ambient data for a specified environment around the vehicle, whether a vehicle user is approaching the vehicle and/or another vehicle which is located in a specified vicinity of the vehicle with a desire to access the vehicle or the other vehicle. If the invention detects that the vehicle user wishing to access the vehicle is approaching the vehicle and/or the other vehicle, the charging current is reduced in a specified manner.

13 Claims, 4 Drawing Sheets

(51) Int. Cl.
  *B60L 3/00* (2019.01)
  *B60L 53/12* (2019.01)
  *B60L 53/60* (2019.01)

(52) U.S. Cl.
  CPC ....... *B60L 2250/20* (2013.01); *B60L 2250/22* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
  USPC ........................................................ 320/108
  See application file for complete search history.

(56) References Cited

U.S. PATENT DOCUMENTS

| | | |
|---|---|---|
| 2010/0026509 A1 | 2/2010 | Boehm et al. |
| 2011/0221388 A1 | 9/2011 | Low et al. |
| 2011/0281535 A1 | 11/2011 | Low et al. |
| 2012/0200151 A1* | 8/2012 | Obayashi ............ B60L 11/123 307/9.1 |

FOREIGN PATENT DOCUMENTS

| | | |
|---|---|---|
| DE | 10 2010 063 125 A1 | 6/2012 |
| DE | 10 2011 115 761 A1 | 4/2013 |
| DE | 10 2013 016 887 A1 | 6/2014 |
| JP | 2010-93957 A | 4/2010 |
| WO | WO 2010/006078 A1 | 1/2010 |
| WO | WO 2012/105242 A1 | 8/2012 |
| WO | WO 2012/144222 A1 | 10/2012 |

OTHER PUBLICATIONS

German Search Report issued in counterpart German Application No. 10 2013 208 005.0 dated Aug. 13, 2013, with Statement of Relevancy (Five (5) pages).

Chinese Office Action issued in Chinese counterpart application No. 201480024793.9 dated Jul. 28, 2016, with English translation (Sixteen (16) pages).

Chinese Office Action issued in Chinese counterpart application No. 201480024793.9 dated Mar. 20, 2017, with English translation (Six (6) pages).

* cited by examiner

METHOD AND APPARATUS FOR OPERATING A CONTACTLESS CHARGING DEVICE FOR THE DISTURBANCE FREE OPERATION OF THE KEYLESS ENTRY SYSTEM

CROSS REFERENCE TO RELATED APPLICATIONS

This application is a continuation of PCT International Application No. PCT/EP2014/058369, filed Apr. 24, 2014, which claims priority under 35 U.S.C. § 119 from German Patent Application No. 10 2013 208 005.0, filed May 2, 2013, the entire disclosures of which are herein expressly incorporated by reference.

BACKGROUND

The invention relates to a method and a device for operating a non-contact charging device for an electric and/or hybrid vehicle. The invention further relates to a vehicle comprising an electric and/or hybrid drive and to a computer program product.

Electrically powered vehicles require a charging device to re-charge the electrical energy store at regular intervals. At present, charging systems are under development, which allow an electric and/or hybrid vehicle to be charged in a non-contact manner. This technology takes advantage of the induction principle, in which current is transmitted from a stationary primary coil to a secondary coil in the electric vehicle by way of a change in the magnetic field. The primary coil, which is installed beneath the road surface, is excited by an external current source, whereby a constantly changing magnetic field is created. This change in the magnetic field induces electrical voltage in the secondary coil, which is located in the vehicle, and charges electrical energy stores, in particular the high-voltage battery, of the electric or hybrid vehicle. These changes in the magnetic field typically have a frequency in the range of 60 kHz to 200 kHz. Motor vehicles increasingly comprise vehicle function systems that use the same frequency range as the charging devices.

SUMMARY OF THE INVENTION

Accordingly, hereby disclosed are methods and corresponding devices for operating a non-contact charging device for an electric and/or hybrid vehicle, which allow interference-free operation of the vehicle.

According to a first and a second aspect, the invention is characterized by a method and a corresponding device for operating a non-contact charging device for an electric and/or hybrid vehicle. The non-contact charging device is designed to provide a charging current for at least one predefined energy store of the vehicle in such a way that a current is transmitted from a stationary primary coil to a secondary coil in the vehicle as a function of a change in the magnetic field generated by the charging device. During a charging phase of the at least one energy store, it is detected, based on predefined environmental data for a predefined surrounding area of the vehicle, whether a vehicle user having a desire to access the vehicle, or another vehicle located in a predefined neighboring region of the vehicle, is approaching the vehicle and/or the other vehicle. When it is recognized that the vehicle user having a desire to access is approaching the vehicle and/or the other vehicle, the charging current is reduced in a predefined manner.

In particular, the charging current can be reduced to zero and the charging phase can therefore be interrupted.

The non-contact charging device for charging the electric and/or hybrid vehicle can advantageously be designed independently of any possible low-frequency interference of other vehicle function systems using the same or a similar frequency range as the charging device. The frequency range of such charging devices is usually in the range from 60 kHz to 200 kHz. The charging device can advantageously be designed in particular with respect to optimal energy transmission. An impairment of the other vehicle function systems during operation of the same can be entirely, or at least partially, avoided. It is not necessary to adapt the other vehicle function systems, in particular to adapt the usable frequency ranges of the same. The other vehicle function systems using the same or a similar frequency range include in particular sensors for tire pressure monitoring and keyless entry systems for vehicles. Keyless entry systems allow a vehicle to be unlocked without active actuation of a vehicle key and to be started by actuating a starter button.

The predefined environmental data is provided by an environment sensor system, for example, which is arranged in the vehicle. For example, the environment sensor system comprises an ultrasonic sensor device and/or a LIDAR sensor device and/or an optical capturing device.

In an advantageous embodiment, at least one image capturing device, which is arranged in or on the vehicle, provides the predefined environmental data. This has the advantage that the environmental data can be easily captured and reliably evaluated, preferably by way of predefined image recognition algorithms. During the charging phase, the at least one image capturing device can be easily supplied with power.

In a further advantageous embodiment, a first camera and/or a second camera, which are arranged in a respective outside side-view mirror of the vehicle, provide the predefined environmental data. This has the advantage that the cameras of the vehicle can be additionally used for further vehicle functions, and it can be easily determined based on the captured data whether the vehicle user having a desire to access is approaching the vehicle and/or the other vehicle.

In a further advantageous embodiment, a third camera, which is arranged in a rear region of the vehicle, provides the predefined environmental data. This likewise has the advantage that the cameras of the vehicle can be additionally used for further vehicle functions, and it can be easily determined based on the captured data whether the vehicle user having a desire to access is approaching the vehicle or the other vehicle. The third camera is arranged on a trunk lid of the vehicle, for example.

In a further advantageous embodiment according to the first and second aspects, it is determined based on the predefined environmental data whether the other vehicle is of the same make as the vehicle. Advantageously, this information can be used for a differentiated reduction of the charging current.

In a further advantageous embodiment according to the first and second aspects, it is determined based on the predefined environmental data whether the other vehicle is an older existing vehicle of the same make as the vehicle. Advantageously, this information can be used for a differentiated reduction of the charging current.

In a further advantageous embodiment according to the first and second aspects, a position of a person approaching the vehicle or the other vehicle is determined relative to the vehicle or the other vehicle based on the environmental data. Depending on the determined position, the person approaching the vehicle or the other vehicle is classified as a vehicle user having a desire to access. This has the advantage that the person approaching the vehicle or the other vehicle can be classified very reliably as a vehicle user having a desire to access. In particular in vehicles having keyless entry systems, this classification can be carried out very easily by comparing the particular position of the person to a predefined target position at which a sensor unit of the keyless entry system detects the particular person.

According to a third aspect, the invention is characterized by a vehicle having an electric and/or hybrid drive and comprising a device according to the second aspect. Advantageous embodiments of the second aspect also apply to the third aspect for this purpose.

According to a fourth aspect, the invention is characterized by a computer program product, which comprises executable program code, wherein the program code carries out the steps of the method according to the first aspect when it is carried out by a data processing device. Advantageous embodiments of the first aspect also apply to the fourth aspect for this purpose.

Exemplary embodiments of the invention will be described hereafter based on the schematic drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
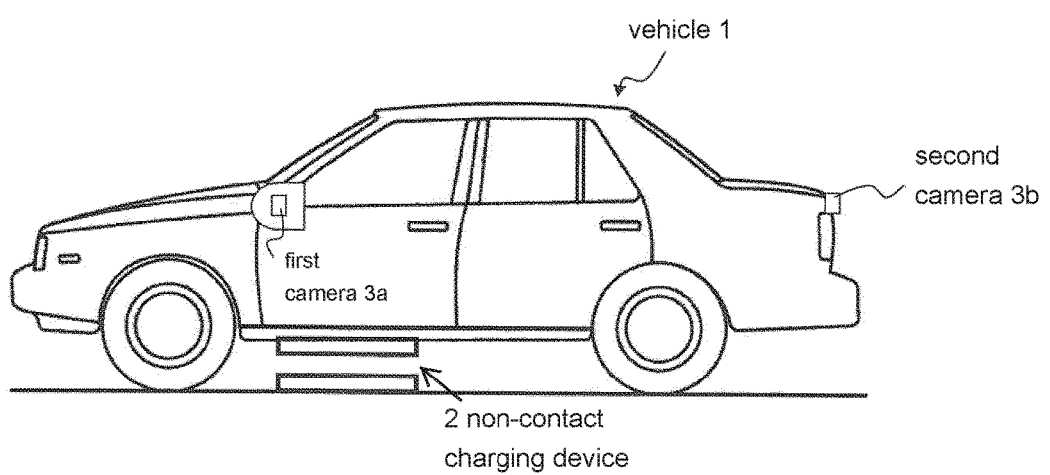
FIG. 1 shows a vehicle comprising an electric drive and a non-contact charging device.

Elements that are identical in terms of design or function are denoted by identical reference numerals throughout the figures.

FIG. 1 shows a vehicle 1 comprising an electric drive and a non-contact charging device 2. The vehicle 1 is designed as a hybrid vehicle, for example. As an alternative, it is also possible that the vehicle 1 is powered only electrically.

The non-contact charging device 2 comprises a primary coil and a secondary coil. The secondary coil of the non-contact charging device is arranged in or on the vehicle 1, for example. The primary coil of the charging device 2 is arranged on the roadway. As an alternative, the primary coil may be arranged in the roadway.

The non-contact charging device 2 is designed to provide a charging current for at least one predefined energy store of the vehicle 1 in such a way that a current is transmitted from the stationary primary coil to the secondary coil in the vehicle 1 as a function of a change in the magnetic field generated by the charging device 2. The vehicle 1 is located in a parking position for this purpose, wherein the vehicle 1 is parked above the primary coil in such a way that the secondary coil is located as precisely as possible on top of the primary coil.

The vehicle 1 furthermore comprises at least one environment sensor. In the example shown in FIG. 1, the vehicle 1 comprises two side cameras 3a, 3c, which are arranged in the respective side-view mirrors of the vehicle 1. The vehicle 1 moreover comprises a rear-view camera 3b, which is arranged on a trunk lid of the vehicle 1.

Figure 2:
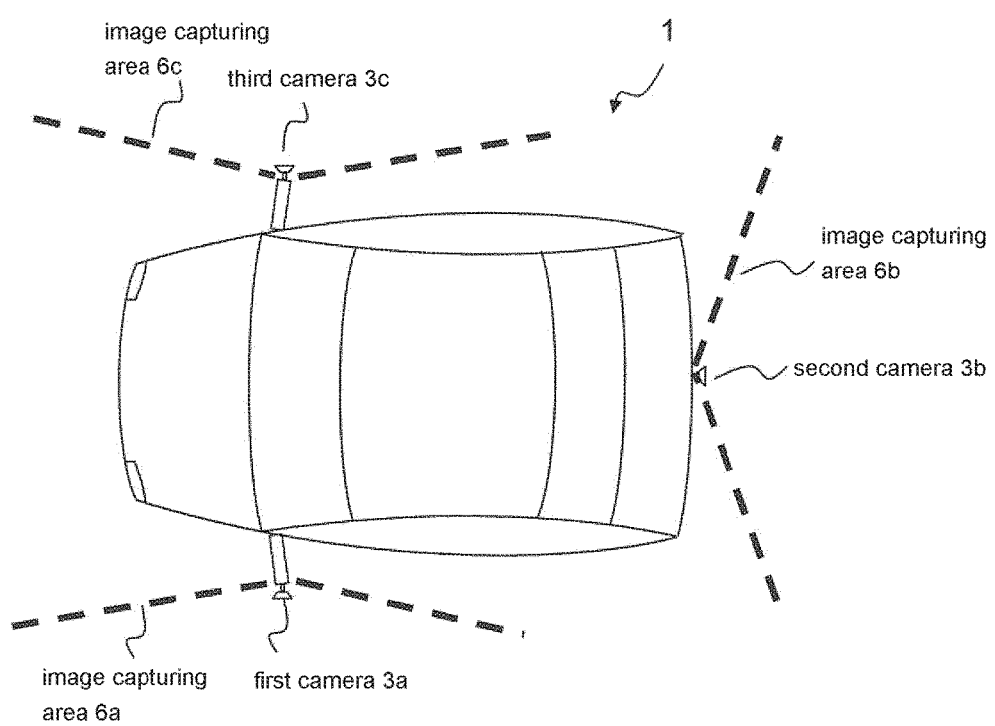
FIG. 2 shows capturing areas of cameras arranged on the vehicle.

FIG. 2 schematically shows the respective capturing areas 6a, 6b, 6c of the cameras 3a, 3b, 3c. The side cameras 3a, 3c each cover a predefined surrounding area in a respective adjacent side region of the vehicle 1 which extends in parallel to a longitudinal axis of the vehicle 1. The rear-view camera 3b is designed and arranged to capture a predefined surrounding area of the vehicle 1 in the rear region and therefore behind the vehicle 1.

Figure 3:
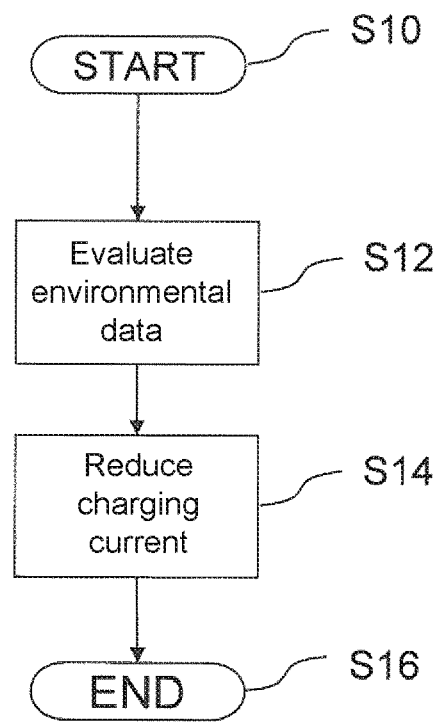
FIG. 3 shows a flow chart for a program for operating the non-contact charging device.

FIG. 3 shows an exemplary flow chart for a program for operating a non-contact charging device 2 for the electric and/or hybrid vehicle.

The program makes it possible to recognize whether a person is approaching the vehicle 1 or another vehicle 1' with the intent to open the vehicle door or the trunk lid. As soon as a person is recognized in a predefined immediate vicinity of the vehicle 1, for example, the output of the non-contact charging process is reduced or the non-contact charging process is interrupted completely.

The program is started in a step S10. The program is started as a charging phase of the vehicle 1 begins, for example.

In a step S12, environmental data, which was captured by at least one predefined capturing device of the vehicle 1 having a predefined capturing area, is evaluated. The capturing device remains activated throughout the non-contact charging process.

Based on predefined environmental data for the predefined surrounding area of the vehicle 1, it is detected whether a vehicle user having a desire to access the vehicle 1, or another vehicle 1' located in a predefined neighboring region of the vehicle 1, is approaching the vehicle 1 and/or the other vehicle 1'. The capturing device comprises an image capturing device, for example, and the image data of the image capturing device is evaluated by way of predefined image recognition algorithms.

In the case of keyless entry systems, it is determined, for example based on a position of a person relative to the vehicle 1, whether the person is a vehicle user having a desire to access the vehicle 1 or the other vehicle 1'.

In keyless entry systems, the vehicle 1 is awakened from what is known as a "sleep mode" with the aid of capacitive and/or optical proximity sensors, for example as soon as a hand approaches a door handle of the vehicle 1 to within a few centimeters, and a control unit of the keyless entry system checks whether the person is authorized to access the vehicle 1. For this purpose, an appropriately designed transponder is located in the region of the person, which emits correctly encoded signals. The transponder uses a backward channel at 125 kHz for transmitting the signals, for example. Proceeding from such a predefined target position for the proximity sensors to respond, it is very easily and reliably possible to classify the person approaching the vehicle 1 or the other vehicle 1' as the vehicle user having a desire to access.

If it is recognized in step S12 that the vehicle user having a desire to access is approaching the vehicle 1 and/or the other vehicle 1', the charging current is reduced in a predefined manner in a step S14. For this purpose, a predetermined control signal is generated, for example, which is transmitted to a control unit of the charging device 2.

Optionally, it is determined in step S12 based on the predefined environmental data whether the other vehicle 1' is of the same make as the vehicle 1 and/or whether the other vehicle 1' is an older existing vehicle of the same make as the vehicle 1. Advantageously, this information can be used for a differentiated reduction of the charging current.

In a step S16, the program is ended after the charging current has been reduced.

Figure 4:
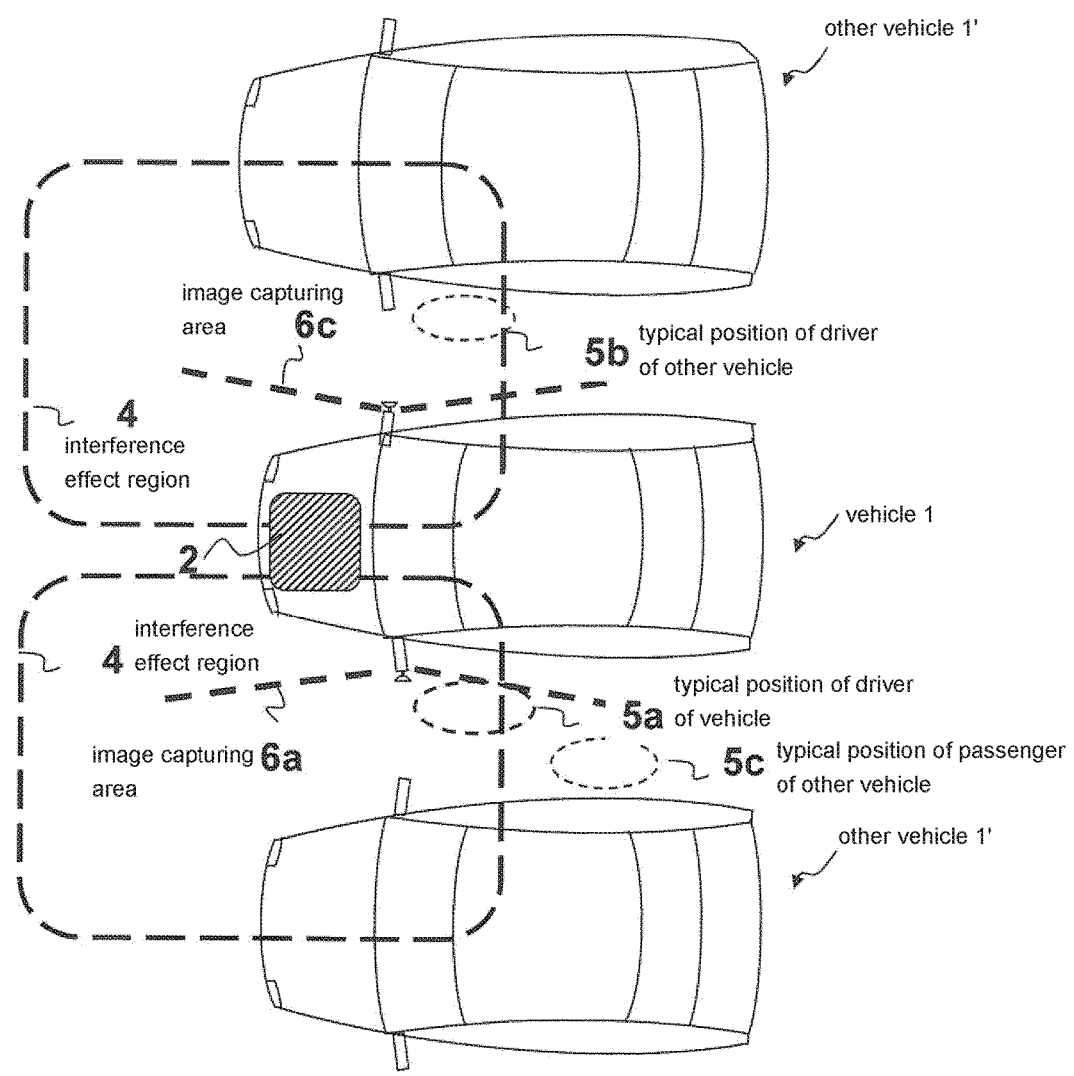
FIG. 4 shows multiple parked vehicles and evaluation positions for a vehicle user having a desire to access.

FIG. 4 shows multiple vehicles 1, 1', for example three, parked next to each other. An interference effect region 4 of the charging device 2 is marked in FIG. 4 by means of two dotted rectangles. This is a drastically simplified representation.

The energy to be transmitted during charging is in a range of several kilowatts, while the sensitivity of a low-frequency coil for key locating is usually in the range of a few nano-tesla. The receivers of the other vehicle function systems cannot be designed in an arbitrary narrowband manner in this frequency range. Significant interference during the charging operation is therefore very likely. For example, such interference may result in the driver, during the charging operation, no longer being able to open the vehicle 1 by way of the keyless entry system, also known as comfort access function. Even if the keyless entry function is optimized for a new development in such a way that there is no impairment during the non-contact charging process, the problem continues to exist for existing vehicles parked directly next to the vehicle 1 during non-contact charging.

FIG. 4 shows typical positions 5a, 5b, 5c that a driver of the vehicle 1, or a driver of the other vehicle 1', or a front passenger of the other vehicle 1', is most likely to assume when wanting to gain access to the vehicle 1 or the other vehicle 1', in particular when wanting to enter the vehicle 1. By means of the image data of the cameras 3a, 3b, 3c, it is very easily possible to determine the position of the respective person relative to the vehicle 1 and to evaluate the position with respect to the desire to access the vehicle 1 or the other vehicle 1'.

LIST OF REFERENCE NUMERALS

1 Vehicle
1' Other vehicle
2 Non-contact charging device
3a, 3b, 3c First, second and third cameras
4 Interference effect region
5a Typical position of the driver of the vehicle
5b Typical position of the driver of the other vehicle
5c Typical position of the front passenger of the other vehicle
6a, 6b, 6c Capturing areas of the cameras
S10, to S16 Program steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a non-contact charging device for at least one of an electric and a hybrid vehicle, wherein the non-contact charging device is configured to provide a charging current for at least one predefined energy store of the vehicle such that a current is transmitted from a stationary primary coil to a secondary coil in the vehicle as a function of a change in the magnetic field generated by the charging device, wherein, during a charging phase of the at least one predefined energy store, the method comprising:

classifying, based on predefined environmental data for a predefined surrounding area of the vehicle, a person approaching another vehicle located in a predefined neighboring region of the vehicle, as desiring access the other vehicle; and reducing the charging current in a predefined manner based at least in part on said classification.

2. The method according to claim 1, wherein at least one image capturing device, which is arranged in or on the vehicle, provides the predefined environmental data.

3. The method according to claim 1, wherein a first camera and/or a second camera, which are arranged in a respective outside side-view mirror of the vehicle, provide the predefined environmental data.

4. The method according to claim 3, wherein a third camera, which is arranged in a rear region of the vehicle, provides the predefined environmental data.

5. The method according to claim 1, wherein the method further comprising determining, based on the predefined environmental data, whether the other vehicle is of a same make as the vehicle.

6. The method according to claim 1, wherein the method further comprises determining, based on the predefined environmental data, whether the other vehicle is an older vehicle of a same make as the vehicle.

7. The method according to claim 5, wherein the method further comprises determining, based on the predefined environmental data, whether the other vehicle is an older vehicle of the same make as the vehicle.

8. The method according to claim 1, wherein the classifying comprises:
determining a position of the person approaching the other vehicle relative to the other vehicle based on the environmental data.

9. The method according to claim 5, wherein the classifying comprises:
determining a position of the person approaching the other vehicle relative to the other vehicle based on the environmental data.

10. The method according to claim 8, wherein reducing the charging current in the predefined manner is based at least in part on said classifying the person as having the desire to access the vehicle.

11. The method according to claim 9, wherein reducing the charging current in the predefined manner is based at least in part on said classifying the person as having the desire to access the vehicle.

12. A device for operating a non-contact charging device for at least one of an electric and a hybrid vehicle, wherein the non-contact charging device is configured to provide a charging current for at least one predefined energy store of the vehicle such that a current is transmitted from a stationary primary coil to a secondary coil in the vehicle as a function of a change in the magnetic field generated by the charging device, wherein, during a charging phase of the at least one predefined energy store, the device is configured to:

classify, based on predefined environmental data for a predefined surrounding area of the vehicle, a person approaching another vehicle located in the predefined neighboring region of the vehicle, as desiring access to the other vehicle, and reduce the charging current in a predefined manner based at least in part on said classification.

13. A vehicle having at least one of electric and a hybrid drive, wherein the vehicle comprises a device configured to operate a non-contact charging device for at least one of an electric and a hybrid vehicle, wherein the non-contact charging device is configured to provide a charging current for at least one predefined energy store of the vehicle such that a current is transmitted from a stationary primary coil to a secondary coil in the vehicle as a function of a change in the magnetic field generated by the charging device, wherein, during a charging phase of the at least one predefined energy store, the device is configured to:

classify, based on predefined environmental data for a predefined surrounding area of the vehicle, a person approaching another vehicle located in the predefined neighboring region of the vehicle, as desiring access to the other vehicle, and reduce the charging current in a predefined manner based at least in part on said classification.

* * * * *